United States Patent Office 3,817,832
Patented June 18, 1974

3,817,832
PROCESS FOR ISOMERIZING GLUCOSE
TO FRUCTOSE
Norman E. Lloyd, Leonard T. Lewis, Robert M. Logan, and Dilip N. Patel, Clinton, Iowa, assignors to Standard Brands Incorporated, New York, N.Y.
No Drawing. Continuation-in-part of application Ser. No. 88,187, Nov. 9, 1970, now Patent No. 3,694,314, which is a continuation-in-part of abandoned application Ser. No. 55,996, July 17, 1970. This application Sept. 25, 1972, Ser. No. 292,067
The portion of the term of the patent subsequent to Sept. 26, 1989, has been disclaimed
Int. Cl. C12b 1/00
U.S. Cl. 195—31 F     16 Claims

ABSTRACT OF THE DISCLOSURE

Process of enzymatically converting glucose to fructose wherein a glucose-containing solution is passed, under specific conditions, through a bed of cells of microorganisms containing cell bound glucose isomerase, said bed having a depth to width ratio of less than about 2.

THE INVENTION

This application is a continuation-in-part of application Ser. No. 88,187 filed Nov. 9, 1970, now U.S. Pat. 3,694,314, which is a continuation-in-part of application Ser. No. 55,996 filed July 17, 1970 now abandoned.

This invention relates to a process of enzymatically converting a portion of the glucose in a glucose-containing solution to fructose.

There are many processes known in the art for producing fructose-containing solutions. These processes may be grouped into three broad categories.

In the first category, sucrose is inverted to glucose and fructose by the use of an acid or invertase.

In the second category, glucose is converted to fructose by the use of alkaline catalysts. There are many papers and patents which disclose various alkaline catalysts and the use thereof for converting glucose to fructose. Exemplary of processes using alkaline catalysts are those disclosed, for instance, in U.S. Pat. 2,487,121 to Fetzer et al.; U.S. Pat. 2,746,889 to Langlois et al.; U.S. Pat. 2,354,664 to Cantor et al.; U.S. Pat. 3,285,776 to Scallet et al.; U.S. Pat. 3,383,245 to Scallet et al.; and U.S. Pat. 3,305,395 to Scallet et al.

However, there are a number of distinct disadvantages associated with alkaline isomerization. For instance, due to the non-selectivity of alkaline catalysts various objectionable by-products are formed, such as large amounts of colored bodies and acidic materials. To refine alkaline-isomerized liquors to remove the objectionable by-products to produce an acceptable product requires rather complicated and costly procedures.

The third category for producing fructose-containing solutions involves enzymatically converting glucose in a glucose-containing solution, e.g., corn syrup, to fructose. Various microorganisms are known in the art which produce glucose isomerase. For example, in an article appearing in Science, vol. 125, pp. 648–9 (1957), it is disclosed that an enzyme derived from *Pseudomonas hydrophila* will isomerize glucose to fructose. Also, British Pat. 1,103,394 and Japanese Pat. 7,428 (1966) to Takasaki et al. disclose that microorganisms classified as belonging to the *Streptomyces* genus, such as *Streptomyces flavovirens*, *Streptomyces achromogenes*, *Streptomyces echinatus* and *Streptomyces albus*, produce glucose isomerase. U.S. Pat. 3,645,848 to Lee et al. disclosed that microorganisms of the *Arthrobacter* genus produce glucose isomerase. There are many other microorganisms which are disclosed in the art as producing glucose isomerase. A few of these other microorganisms disclosed are, for instance, *Aerobacter cloacae*, *Bacillus megaterium*, *Acetobacter suboxydans*, *Acetobacter melanogenus*, *Actobacter roseus*, *Actobacter oxydans*, *Bacillus fructose* and *Lactobacillus fermenti*.

Because of the economics involved in producing glucose isomerase, it is of the utmost importance to use the isomerase under conditions whereby maximum yields of fructose are produced using minimum quantities of glucose isomerase. Moreover, the conditions for isomerization should be such that minimal quantities of objectionable by-products are produced.

Glucose isomerase is produced primarily intracellularly by the above microorganisms. Thus, the major portion of the glucose isomerase is found within and/or on the cell walls of the microorganisms. In some instances when these cells are used to isomerize glucose to fructose, the isomerase during isomerization is release or is extracted therefrom. This is generally the case in cells derived from microorganisms of the *Streptomyces* genus. When the isomerase is released or extracted from the cells it is essentially solubilized. It would involve a rather costly and complicated procedure to recover the solubilized isomerase so that it can be used in another isomerization reaction.

In an article entitled, "*Streptomyces* Glucose-Isomerase" which appeared in *Fermentation Advances* (1969), pp. 561–589, glucose isomerase derived from a microorganism belonging to the *Streptomyces* genus was fixed or stabilized on and/or within the cells. This fixation or stabilizing treatment consisted of heating cells containing intercellular glucose isomerase. Cells of microorganisms of the *Arthrobacter* genus generally contain glucose isomerase inherently fixed and/or stabilized. Thus these cells can be used directly to isomerize glucose to fructose without being treated and the isomerase is neither released or extracted.

It is the principal object of the present invention to provide a continuous process for enzymatically isomerizing glucose to fructose using cells of microorganisms containing intracellular glucose isomerase which is naturally fixed or stabilized.

This object and other objects may be attained in accordance with the present invention by forming a glucose-containing solution having a viscosity of from about 0.5 centipoise to about 100 centipoise, a pH in the range of from about 6 to about 9 and containing from about 5 to about 80 percent dry substance glucose, heating said solution to a temperature in the range of from about 20° to about 80° C. and passing the solution through a bed of cells of microorganisms containing intracellular glucose isomerase which is naturally fixed or stabilzed, having a glucose isomerase activity of at least 3 IGIU per cubic centimeter of bed and a stability value of at least 50 hours, thereby converting up to 54 percent of the glucose to fructose. The ratio of the depth to the width (or diameter) of the bed should be less than about 2. The flow rate of the glucose-containing solution passing through the bed should be such that the color of the solution exiting the bed is increased by less than 2 color units and there is no substantial production of psicose.

Various terms and expressions used in the foregoing and in the discussion hereinafter are defined as follows:

STABILITY VALUE

The stability value is determined by placing a sufficient amount of the naturally fixed glucose isomerase in a column to obtain from 1000 to 4000 IGIU therein. A solution that is 3 molar in glucose at a pH 7, 0.001 molar in $CoCl_2$ and 0.005 molar in MgSO$_3$ is passed through the column at a rate of from 20 to about 80 ml./hr. The column is maintained at a temperature of 60° C. The fraction of glucose converted to fructose in the effluent is determined after 20 hours to insure that the bed of fixed glucose isomerase is under equilibrium conditions. The activity index of the fixed glucose isomerase is calculated using the following formula:

Activity Index $= (R/E)$ log $(0.504/(0.504 - I))$ where I is the fraction of glucose converted to fructose, R is the flow rate (ml./hr.) and E is the number of IGIU initially in the column.

The Activity Index is determined periodically and the time it takes for the Activity Index to reach one-half the initial value (value after 20 hours) is the stability value in hours.

COLOR UNITS

Color was determined spectrophotometrically by measuring the absorbance at 450 m$\mu$ and 600 m$\mu$ of an appropriately diluted liquor in a 1-cm. cell versus water as a reference. The spectrophotometer was a Beckman DK–2A, manufactured by Beckman Instrument Company. The color was calculated by using the following formula:

$$\text{Color Units} = \frac{109(A_{450} - A_{600})}{C}$$

$A_{450}$ = absorbance at 450 m$\mu$
$A_{600}$ = absorbance at 600 m$\mu$
$C$ = concentration in grams of dry substance per 100 ml. of liquor.

FRUCTOSE CONTENT OF ISOMERIZED LIQUOR

Fructose content of the isomerized liquor was determined by measuring the change in specific rotation which occurred during isomerization. Specific rotations were measured using a Bendix Corporation NPL Model 969 Automatic Polarimeter. The rotations were determined at a concentration of 2.5 g./100 ml. in a glass cell thermostated at 25° C. The path of the cell was 50 mm. The specific rotations were determined at the beginning of the isomerization reactions after all ingredients in the glucose-containing solutions had been combined. To determine change in fructose content the specific rotation of the isomerized liquor was determined. All samples were adjusted to pH 4.0 with dilute hydrochloric acid in order to halt enzyme action before dilution for determination of rotations. Change in fructose content was calculated by using the following formula:

$$\text{Percent } F = \frac{100(A_1 - A_0)}{-138.9}$$

$A_1$ = specific rotation of isomerized liquor.
$A_0$ = specific rotation of glucose-containing solution before isomerization.

In the formula the factor −138.9 is the change in specific rotation which occurs when glucose is converted completely to fructose.

IGIU

IGIU is the abbreviation of an International Glucose Isomerase Unit and is that amount of enzyme which will convert 1 micromole of glucose to fructose per minute in a solution containing 2 moles of glucose per liter, 0.02 moles of MgSO$_4$ per liter, and 0.001 moles of CoCl$_2$ per liter at a pH of 6.84 to 6.85 (0.2 M sodium maleate) and a temperature of 60° C.

EXTRACTABILITY COEFFICIENT

Cellular material containing fixed or stabilized isomerase is held in an aqueous suspension containing 0.001 moles of cobalt chloride per liter at a temperature of 58° C. and a pH of 6.5 (0.05 M sodium meleate buffer). The cellular material is held under these conditions for 20 hours. A portion of the suspension is sonicated at 20 kilocycles by the use of a Branson S75 Sonifier. The sonicated material is centrifuged and the centrifugate analysed for isomerase activity. Another portion of the suspension (not sonicated) is centrifuged and the isomerase activity of this centrifugate is determined. The activity of extracted isomerase in the latter centrifugate divided by the activity of the isomerase in the centrifugate from the sonication treatment multiplied by 100 is the extractability coefficient of the cellular material.

The process of the present invention provides a number of distinct advantages. For example, it provides a process which can easily and economically be performed in a commercial operation. Furthermore, it is extremely efficient in respect to the utilization of the glucose isomerase and the production of a glucose-fructose syrup containing minimal color, ash and psicose. Moreover, the isomerization reaction may be performed continuously, which, of course, is a distinct advantage in any manufacturing operation.

The characteristics of the glucose-containing solution are somewhat important in determining the exact conditions under which the isomerization reaction is performed. There are many methods known in the art for the production of glucose-containing solutions. For instance, the methods which are currently being practiced commercially principally involve saccharifying corn starch to glucose. These methods may be grouped into three categories. The first is an acid process in which a dilute acid solution is used to hydrolyze starch to glucose. The second is an acid-enzyme process in which starch is liquefied by a mill acid treatment and then an enzyme is used to convert the liquefied starch to glucose. The third is an enzyme-enzyme process in which two enzyme treatments are used, the first to liquefy the starch and the second to convert the liquefied starch to glucose. In the process of the present invention, it is preferred to use a glucose-containing solution produced by either of the latter two processes since such solutions, generally, contain greater amounts of glucose on a dry substance weight basis, lesser amounts of acids which must be substantially neutralized, less color and lower amounts of oligosaccharides. The glucose-containing solution may be refined, if desired, by conventional means prior to its being subjected to the process of the present invention.

The viscosity of the glucose-containing solution should be in the range of from about 0.5 centripoise to about 100 centipoise and preferably should be from about 2 centipoise to about 20 centipoise. If the viscosity of the solution is too high, the pressure required to pass the solution through the bed will be unreasonably high. Reducing the pressure results in reduction of flow rates so that the time that the solution is in contact with the naturally fixed isomerase may be too long to make effective use of the enzyme. Also, because the length of time that the solution is maintained under isomerization conditions, e.g., temperature, pH, etc., may be excessive, there is the likelihood that an undesirable amount of color and psicose would be produced.

The concentration of glucose in the glucose-containing solution should be in the range of from about 5 to about 80 percent by weight and preferably should be in the range of from about 40 to about 60 percent.

The pH of the glucose-containing solution should be in the range of from about 6 to about 9, preferably from about 6.5 to about 8 and most preferably from about 7 to about 8. It is important to maintain the pH of the glucose-containing solution within this range during the isomerization reaction since if the solution is outside this range the isomerase will be quickly inactivated and/or large amounts of unwanted by-products such as color bodies and psicose will be produced. In the glucose-containing solution there may be various ion activators and/or stabilizers for the isomerase, such as soluble salts of cobalt, magnesium, etc.

The characteristics of the bed of cells of microorganisms containing natural fixed or stabilized glucose isomerase are extremely important in respect to the quality of the fructose-glucose solution produced and the commercial utilization of the present process. The bed should contain at least 3 IGIU of glucose isomerase activity per cubic centimeter and preferably contain at least 20 IGIU per cubic centimeter. If the bed contains less than 3 IGIU of glucose isomerase activity per cubic centimeter, a greater bed volume may be necessary to isomerize equivalent amounts of glucose. This may present various attendant problems such as greater pressure drops across the bed, longer contact times between the glucose-containing solution and the isomerase to produce the desired degree of conversion of glucose to fructose and greater capital expense because of the greater size of the equipment needed to contain the bed of cells. Furthermore, as the depth of the bed is increased there is a greater tendency for compaction of the bed due to the high pressures which must be employed to pass the glucose-containing solution therethrough. For example, in a relatively shallow bed, the bed can only compact to a small extent while in a bed of greater depth the compaction can be much greater. When this occurs the pressure drop across the bed will increase to such an extent that the pressure necessary to pass the glucose solution through the bed may be extraordinarily high, and may be so high that conventionally constructed equipment can not be used to contain the bed.

The stability value of the fixed glucose isomerase should be at least 50 hours, preferably at least about 300 hours and most preferably at least 400 hours.

The extractability coefficient of the cells containing naturally fixed or stabilized glucose isomerase should be less than about 50 percent, preferably less than about 20 percent and most preferably less than about 10 percent.

The ratio of the depth to the width (or diameter) of the bed of the microorganisms containing naturally fixed or cell bound glucose isomerase should be less than 2, preferably in the range of from about 0.01 to about 0.1, and most preferably in the range of from about 0.02 to about 0.05. It is contemplated that the depth of the bed of the cells containing glucose isomerase will, for insance, be in the range of from a fraction of an inch to about 5 inches. Beds of cells having these dimensions provide the advantage that the pressure drop across the bed is small and that compaction of the bed is minimal. However, since the depth of the bed is relatively small there is a greater tendency of channeling to occur. Channeling results in inefficient use of the glucos isomerase. If at least two beds and preferably at least six beds, of naturally fixed or stabilized glucose isomerase are positioned in series and there is provision for mixing the effluent from a previous bed before it is passed through a subsequent bed, any channeling which might occur would not have a serious effect on the efficiency of the use of the naturally fixed or stabilized glucose isomerase.

Glucose isomerase preparations may be divided into two broad categories, depending upon whether they are heat stable or heat labile. Exemplary of heat liable isomerase preprations for those derived from *Pseudomonas hydrophila* and certain other microorganisms. In order for these cell preparations to convert any appreciable amount of glucose to fructose there generally must be present during the isomerization reaction, arsenate or fluoride ions. The heat stable isomerase preparations do not required that such ions be present during isomerization to convert appreciable quantities of glucose to fructose. Exemplary of microorganisms which produce heat stable glucose isomerase prepartions are the microorganisms to the *Arthrobacter* genus. In the present process it is preferred to use heat stable isomerase prepartions. When such are used, high temperatures may be employed to inhibit or prevent microbial contamination of the bed.

An apparatus known in the art which can be used to carry out the present process is a pressure leaf filter. The pressure leaf filter comprises an assembly of flat filtering elements (leaves) supported vertically or hozitonally in a cylindrical tank. The leaves may be circular or rectangular and have filtering surfaces on both sides. The filter leaf may consist of a heavy screen or grooved plate over which a filter medium such as woven fabric or fine wire cloth is fitted. The cellular material containing fixed isomerase may be slurried in a glucose-containing solution and this slurry pumped through the pressure leaf filter in such a mnner as to evenly cover each leaf with the cells. The pressure applied to the solution will hold, in the case of a vertical pressure leaf filter, the cells to the leaves. A glucose-containing solution may then be pumped through the pressure leaf filter and white it passes through each bed of cellular material containing fixed isomerase, isomerization will occur. The amount of fructose formed will be dependent upon the period of time that the glucose solution is in contact with the naturally fixed or stabilized enzyme.

The exact composition of the isomerized glucose-containing solution will vary depending upon the exact conditions under which the present process is performed. In Table I, below, the essential characteristics of isomerized glucose-containing solution produced by the present invention are shown.

TABLE I.—CHARACTERISTICS OF ISOMERIZED GLUCOSE CONTAINING SOLUTIONS PERCENT DRY BASIS

| Ranges | Glucose [1] | Fructose [1] | Polysaccharides [1] | Psicose | Ash [2] | Color units |
|---|---|---|---|---|---|---|
| Typical | 30–60 | 10–54 | 0–50 | 0–1.0 | 0.1–0.5 | 0–2 |
| Preferred | 30–60 | 10–54 | 0–30 | 0–0.5 | 0.1–0.2 | 0–0.05 |
| Most preferred | 30–60 | 10–54 | 0–30 | 0–0.1 | 0.05–0.1 | 0–0.03 |

[1] Amount of the saccharides principally dependent upon the characteristics desired in the product.
[2] Principally composed of metallic salts which are present during isomerization to stabilize and/or activate the glucose isomerase.

In order to describe more clearly the nature of the present invention, a specific example will hereinafter be described. It should be understood, however, that this is done solely by way of example and is intended neither to delineate the scope of the invention nor limit the ambit of the appended claims.

EXAMPLE

This example illustrates the use of naturally fixed or stabilized glucose isomerase to continuously convert glucose to fructose.

Microorganisms of the *Arthrobacter* sp. ATCC 21748 were grown under submerged aerobic conditions and the cells harvested. The cells had a glucose isomerase activity of 49 IGIU/g. and an extractability coefficient of 2.5 percent. 0.644 g. of the cells were mixed with 3.0 g. of filter aid (Dicalite Superaid, manufactured by Grefco, Inc., Los Angeles, Calif.), and 40–45 ml. of a glucose-containing solution containing 61 g. of glucose per 100 ml. at a pH of 7.5 containing $5 \times 10^{-4}$ moles of $CoCl_2$ per liter, $5 \times 10^{-3}$ moles of $Na_2SO_3$ per liter and $5 \times 10^{-3}$ moles $MgSO_4$ per liter. The glucose-containing solution having the above identified ingredients was used throughout this Example. This slurry was stirred for one hour under reduced pressure (about 23″ Hg) to deaerate the same and then transferred to a water jacketed column (diameter of 2.5 cm.) which was maintained at 65° C. The bottom of the column was equipped with an Adjusta-Chrom column plunger (Ace Glass, Inc., Vineland, N.J.) which was precoated with Dicalite. A glucose-containing solution was pumped through the column to form a bed of the cells. The bed formed had a height of 2.2 cm. Then a fine mesh stainless steel screen was placed on the top of the bed and the screen was covered with a layer of glass beads (2–3 cm. diameter). Glass wool soaked in the glucose-containing solution was packed loosely above the glass beads to a depth of 4 to 5 cm. A flow adapter (Pharmacia Fine Chemicals, Inc., Piscataway, N.J.) connected to a proportioning pump was placed in the column immediately above the glass wool and glucose-containing solution was pumped downwardly through the bed at a rate of 0.090 ml./min. After 22 hours the conversion of glucose to fructose was 16.1 percent and after 238 hours the conversion was 10.3 percent.

Microorganisms of the *Arthrobacter* sp. NRRL B–3726 and *Arthrobacter* sp. NRRL B–3728 were grown under submerged aerobic conditions and the cells harvested. The cells of the former microorganism had a glucose isomerase activity of 124 IGIU/g. and an extractability coefficient of 4.1 percent. The cells of the latter microorganism had an activity of 93 IGIU/g. and an extractability coefficient of 7.2 percent.

Beds of cells of these microorganisms were prepared in the manner described above using 0.611 g. of cells of *Arthrobacter* sp. NRRL B–3728 and 0.607 g. of cells of *Arthrobacter* sp. NRRL B–3726. In the case of the former microorganism, the bed depth was 2 cm. and in the case of the latter the bed depth was 2.1 cm. A glucose-containing solution was continuously passed through the bed of cells of *Arthrobacter* sp. NRRL B–3726 at a rate of 0.080 ml./min. After 21 hours the conversion of glucose to fructose was 26.6 percent and after 361 hours the conversion of glucose to fructose was 18.2 percent. Glucose-containing solution was pumped through the bed of cells of *Arthrobacter* sp. NRRL B–3728 at a rate of 0.090 ml./min. After 18 hours the conversion of glucose to fructose was 22.4 percent and after 378 hours the conversion was 11.6 percent.

The terms and expressions which have been employed are used as terms of description and not of limitation, and it is not intended in the use of such terms and expressions to exclude any equivalents of the features shown and described.

What is claimed is:

1. A process of enzymatically converting glucose to fructose which comprises forming a glucose-containing solution having a viscosity of from about 0.5 to about 100 centipoise, a pH in the range of from about 6 to about 9 and containing from about 5 to about 80 percent glucose by weight; heating said solution to a temperature of from about 20° to about 80° C., and passing said solution through a bed containing cells of microorganisms containing intracellular glucose isomerase which is naturally fixed having a glucose isomerase activity of at least about 3 IGIU per cubic centimeter of bed, a stability value of at least about 50 hours, an extractability coefficient of less than about 50 percent, and a depth to width ratio of less than about 2 at a flow rate whereby up to 54 percent of the glucose by weight is converted to fructose, the color of the converted solution is increased by less than 2 color units and there is no substantial production of psicose.

2. A process of enzymatically converting glucose to fructose as defined in claim 1, wherein the cells are derived from microorganisms belonging to the *Arthrobacter* genus.

3. A process of enzymatically converting glucose to fructose as defined in claim 2, wherein the viscosity of the glucose-containing solution is from about 2 to about 20 centipoise and the pH of the solution is from about 6.5 to about 8.

4. A process of enzymatically converting glucose to fructose as defined in claim 3, wherein the glucose-containing solution contains from about 40 to about 60 percent glucose by weight and the pH of the solution is from about 7 to about 8.

5. A process of enzymatically converting glucose to fructose as defined in claim 3, wherein the bed containing cells of the microorganisms contains at least 20 IGIU per cubic centimeter of bed.

6. A process of enzymatically converting glucose to fructose as defined in claim 5, wherein the stability value of the cells of the microorganisms is at least 300 hours.

7. A process of enzymatically converting glucose to fructose as defined in claim 6, wherein the stability value of the cells of the microorganisms is at least 400 hours.

8. A process of enzymatically converting glucose to fructose as defined in claim 6, wherein the bed has a depth to width ratio in the range of from about 0.01 to about 0.1.

9. A process of enzymatically converting glucose to fructose as defined in claim 8, wherein the bed has a depth to width ratio in the range of from about 0.02 to about 0.05.

10. A process of enzymatically converting glucose to fructose as defined in claim 9, wherein the glucose-containing solution is passed through at least 2 beds which are positioned in series.

11. A process of enzymatically converting glucose to fructose as defined in claim 2, wherein the cells of the microorganisms are derived from the group consisting of *Arthrobacter* sp. NRRL B–3726, *Arthrobacter* sp. NRRL B–3728, and *Arthrobacter* sp. ATCC 21748.

12. A process of enzymatically converting glucose to fructose as defined in claim 1, wherein the glucose-containing solution passed through the bed is produced by treating starch with an acid to liquefy the starch and then treating the liquefied starch with a glucose-forming enzyme to obtain the glucose-containing solution.

13. A process of enzymatically converting glucose to fructose as defined in claim 1, wherein the glucose-containing solution passed through the bed is produced by treating starch with an enzyme to liquefy the starch and then treating the liquefied starch with a glucose-forming enzyme to obtain the glucose-containing solution.

14. A process of enzymatically converting glucose to fructose as defined in claim 10, wherein the glucose-containing solution is passed through at least 6 beds positioned in series.

15. A process of enzymatically converting glucose to fructose as defined in claim 2, wherein the extractability coefficient of the cells containing naturally fixed glucose isomerase is less than about 20 percent.

16. A process of enzymatically converting glucose to fructose as defined in claim 15, wherein the extractability coefficient of the cells containing naturally fixed glucose isomerase is less than about 10 percent.

References Cited

UNITED STATES PATENTS

| | | | |
|---|---|---|---|
| 3,645,848 | 2/1972 | Lee, et al. | 195—31 F |
| 3,402,103 | 9/1968 | Amberg, et al. | 195—116 |
| 1,896,811 | 2/1933 | Currie et al. | 195—47 |

OTHER REFERENCES

Takasaki, et al.: *Ferm adv.*, p. 561–89, D. Perlman, editor, Academic Press, 1969.

A. LOUIS MONACELL, Primary Examiner

T. G. WISEMAN, Assistant Examiner

UNITED STATES PATENT OFFICE
CERTIFICATE OF CORRECTION

Patent No. 3,817,832          Dated June 18, 1974

Inventor(s) Norman E. Lloyd, Leonard T. Lewis, Robert M. Logan and Dilip N. Patel It is certified that error appears in the above-identified patent and that said Letters Patent are hereby corrected as shown below:

Column 2, lines 5-6; "Actobacter roseus" should read--Acetobacter roseus--; "Actobacter oxydans" should read--Acetobacter oxydans--.

Column 2, line 20; "release" should read--released--.

Column 2, line 34; "intercellular" should read--intracellular--

Column 2, line 54; "stabilzed" should read--stabilized--.

Column 3, line 75; "meleate" should read--maleate--.

Column 4, line 32; "mill" should read--mild--.

Column 4, line 47; "centripoise" should read--centipoise--.

Column 5, line 2; "natural" should read--naturally--.

Column 5, lines 52-53; "insance" should read--instance--.

Column 5, line 59; "glucos" should read--glucose--.

Column 5, line 69; "liable" should read--labile--.

Column 5, line 70; "prepartions" should read--preparations--; "for" should read--are--.

Column 6, line 1; "required" should read--require--.

Column 6, lines 4 and 6; "prepartions" should read--preparations--.

Column 6, line 5; before "to" insert--belonging--.

UNITED STATES PATENT OFFICE
CERTIFICATE OF CORRECTION

Patent No. 3,817,832          Dated June 18, 1974

Inventor(s) Norman E. Lloyd, Leonard T. Lewis, Robert M. Logan, and Dilip N. Patel It is certified that error appears in the above-identified patent and that said Letters Patent are hereby corrected as shown below:

Column 6, line 12; "hozitonally" should read --horizontally--.

Column 6, line 14; after "sides." insert --The cylindrical tank may have its long axis horizontal or vertical--; "The" should read --A--.

Column 6, line 20; "mnner" should read --manner--.

Column 6, line 24; "white" should read --while--.

Column 6, line 34; "solution" should read --solutions--.

Column 7, line 68; "proces" should read --process--.

Signed and Sealed this thirtieth Day of March 1976

[SEAL]

Attest:

RUTH C. MASON
*Attesting Officer*

C. MARSHALL DANN
*Commissioner of Patents and Trademarks*